United States Patent [19]
DeMott

[11] 4,355,065
[45] Oct. 19, 1982

[54] SOIL-RESISTANT TEXTILE MATERIALS

[75] Inventor: Roy P. DeMott, Spartanburg, S.C.

[73] Assignee: Milliken Research Corporation, Spartanburg, S.C.

[21] Appl. No.: 251,693

[22] Filed: Apr. 7, 1981

Related U.S. Application Data

[63] Continuation-in-part of Ser. No. 144,152, Apr. 28, 1980, abandoned.

[51] Int. Cl.³ .............................................. B32B 3/00
[52] U.S. Cl. .................................... 428/195; 428/95; 428/96; 428/196; 428/197; 428/252; 428/253; 428/267; 428/287; 428/421; 428/420
[58] Field of Search ............... 428/246, 252, 253, 267, 428/260, 287, 421, 920, 492, 290, 95, 96, 195, 196, 197

[56] References Cited

U.S. PATENT DOCUMENTS 4,219,605  8/1980  Rohringer ............................ 428/289
4,232,087  11/1980  Trask .................................. 428/389
4,265,962  5/1981  May ..................................... 428/290

Primary Examiner—James J. Bell
Attorney, Agent, or Firm—H. William Petry; Terry T. Moyer

[57] ABSTRACT

A textile material suitable for use as an automotive upholstery fabric is provided, which comprises:
(a) a body portion having a face and a back comprised of synthetic, thermoplastic fibers;
(b) said body portion being provided with a substantially oil- and water-repellent fluoropolymer substantially evenly distributed on the face thereof in a minor amount sufficient to improve soil resistance characteristics but less than an amount which would cause said material to burn at a rate in excess of about 2 inches per minute or to support such burning for longer than about one minute; and
(c) said textile material further having been back-coated with a flame-retardant backcoating in an amount sufficient to improve the flammability characteristics of said textile material.

8 Claims, 6 Drawing Figures

SOIL-RESISTANT TEXTILE MATERIALS

This application is a continuation-in-part of my copending prior application, Ser. No. 144,152, filed Apr. 28, 1980, now abandoned.

This invention relates to a process for imparting flame resistance properties to textile materials and to textile materials produced thereby. In one aspect, the invention relates to a process for the application of a substantially oil- and water-repellent fluoropolymer to the surface of a textile material comprised of synthetic thermoplastic fibers in such a manner that the fluoropolymer is very evenly distributed on the surface of the textile material. In yet another aspect, the invention relates to a fluoropolymer-modified textile material particularly suitable for automotive upholstery applications having improved soil resistance and flammability characteristics.

The treatment of textiles with fluorocarbon polymers to impart water- or oil-repellency has been known in the art for several years. Generally, such treatments are accomplished either by padding a solution of the fluorocarbon polymer onto the textile material or by spraying a solution of the fluorocarbon onto the material. While such techniques have been found to be generally quite satisfactory with regard to the imparting of water- and oil-repellency to the textile material, such methods of application generally result in a product having substantially reduced, and in some cases unacceptable, flammability characteristics. Such undesirable characteristics have substantially limited the end uses of the thus-treated textile materials. For instance, in the area of automotive upholstery applications, the flame-retardance standards which have been imposed upon the materials by the U.S. Government have been such that it has been thought to be impossible to render the materials oil- and water-repellent while at the same time meeting such government standards.

The development of chemical finishing procedures to impart flame resistance to textiles has also become a major concern both to government and industry. The establishment of more stringent standards regarding the flammability of textiles, and in particular automotive upholstery, has substantially limited the ability of the textile industry to provide products which not only meet the flammability standards, but which also are soil-resistant under the conditions of intended use.

Therefore, an object of the present invention is to provide a process for imparting soil resistance to textile materials such as upholstery fabrics and especially automotive upholstery. Another object of the present invention is to provide a process for imparting soil resistance to textile materials which does not suffer from the aforementioned disadvantages of the prior art. Yet another object of the invention is to provide a textile material made from synthetic, thermoplastic fibers that is suitable for use as an automotive upholstery fabric exhibiting not only excellent soil resistance characteristics but which also meets or preferably even exceeds all governmentally imposed flammability standards. These and other objects, advantages, and features of the present invention will become apparent to those skilled in the art from a reading of the following detailed disclosure.

According to the present invention, a textile material suitable for use as an automotive upholstery fabric is provided, which comprises:

(a) a body portion having a face and a back comprised of synthetic, thermoplastic fibers;
(b) said body portion being provided with a substantially oil- and water-repellent fluoropolymer substantially evenly distributed on the face thereof in a minor amount sufficient to improve soil resistance characteristics but less than an amount which would cause said material to burn at a rate in excess of about 2 inches per minute or to support such burning for longer than about one minute; and
(c) said textile material further having been backcoated with a flame-retardant backcoating in an amount sufficient to improve the flammability characteristics of said textile material.

A process by means of which the textile materials of the present invention may be prepared is disclosed in copending prior application Ser. No. 144,152, filed Apr. 28, 1980 now abandoned, of which the present application is a continuation in part. According to that prior application, an improved process is provided for imparting soil resistance to textile materials made from synthetic thermoplastic fibers, e.g., polyester fibers, wherein the flame retardance characteristics of such materials are not substantially adversely affected. Broadly described, the process for improving the soil resistance characteristics of such textile materials comprises applying an effective minor amount, e.g., less than about 0.3, preferably less than about 0.25 percent by weight on a solids add-on basis of a substantially oil- and water-repellent fluoropolymer to the surface of the textile material, drying and curing the resulting fluoropolymer-modified textile material. The textile material may be treated with an aqueous acid solution to lower the pH of the textile material to a pH of less than about 7, generally from about 4.0 to about 6.5, prior to applying the substantially oil- and water-repellent fluoropolymer to the textile material. Further, the back surface of the textile material is coated with a flame-retarding composition, e.g., backcoated either before, during, or after (but preferably after) the application of the fluoropolymer to same.

A drawing accompanies and is made a part of this disclosure.

Figure 4:
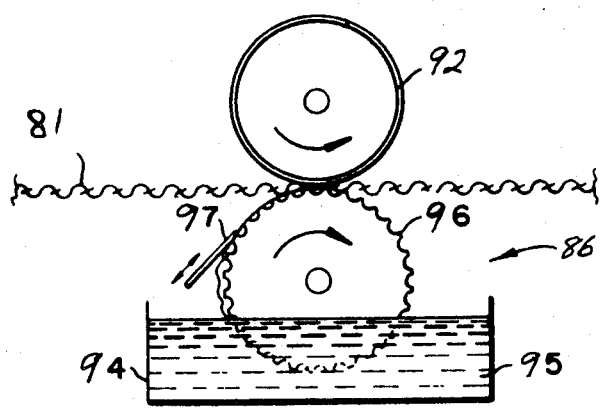
Figure 5:
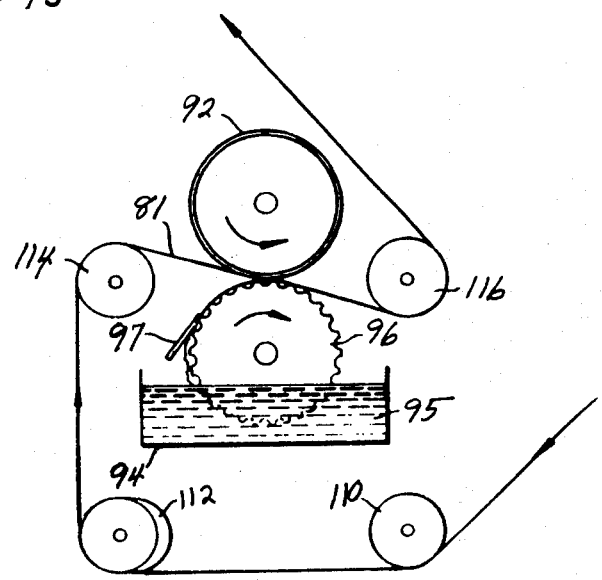
Figure 6:
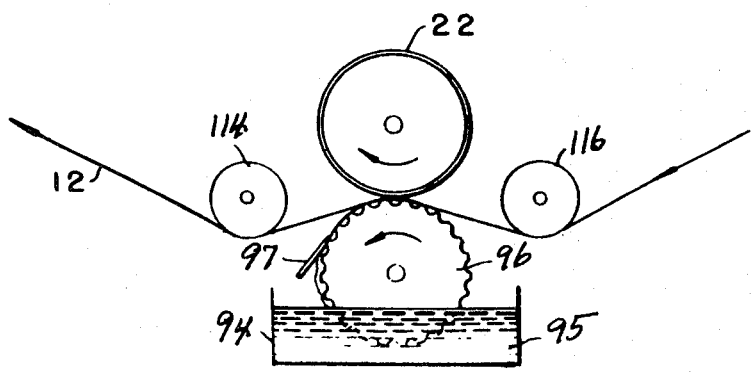

FIGS. 4, 5, and 6 are representations of alternative embodiments for applying the fluoropolymer to the textile material.

A wide variety of synthetic thermoplastic fibers may be used to form the body portion of the textile material of the invention. Such materials may include, for instance, polyamide fibers, e.g., nylon, especially nylon 6,6 and nylon 6; polyester fibers; and even acrylic fibers, as well as combinations of such fibers with each other. Polyester fibers are, however, the preferred thermoplastic fibers. While the invention is preferably directed to textile materials made substantially entirely from synthetic thermoplastic fibers, it should be understood that minor amounts, e.g., up to about 10 percent or even more of one or more natural fibers such as cotton or wool, may be provided in the textile material, so long as the basic characteristics of the textile material are not substantially altered. The textile materials of the invention may include woven, knitted, tufted, and nontufted textile materials. As to woven textile materials, it may be desirable to surface-finish such fabrics by, for instance, napping and shearing them to provide a fabric suitable for automotive or other upholstery applications.

Once the desired textile material substrate has been selected, the soil resistance characteristics of such material may be improved according to the invention by applying an effective minor amount of a substantially oil- and water-repellent fluoropolymer to the textile material to substantially cover the fibers of such material in the stratum of fibers on and near the surface of the textile material, thereby forming a discrete, discontinuous polymer coating on such fibers. Especially desirable results can be obtained when the amount of fluoropolymer employed is sufficient to provide the desired discrete, discontinuous polymer coating on substantially all of the fibers of the textile materials at or near the surface of such material. Generally, a discrete, discontinuous fluoropolymer coating formed on the fibers on the stratum of the fibers on and near the face of the fabric may be provided by applying to the textile material less than about 0.3, preferably less than about 0.25 percent, e.g., less than about 0.2 weight percent of the fluoropolymer on a solids add-on basis, based upon the weight of the textile material. When less than about 0.01 weight percent is applied generally, the soil resistance of the product may be inferior or unsatisfactory; and where more than about 0.3 weight percent is applied, the flame resistance standards for the textile material product may not be achievable. However, when from about 0.1 to about 7.5, preferably about 0.5 to about 1 weight percent, based on the weight of the textile material of a fluoropolymer extender is used in combination with the fluoropolymer, the amount of fluoropolymer applied to the textile material may be reduced to an amount of less than about 0.15 or even less than about 0.1 weight percent without substantially adversely affecting the improved soil resistance characteristics of the fluoropolymer-modified textile material.

According to copending patent applicational Ser. No. 144,152, filed Apr. 28, 1980, the fluoropolymer is applied by means of an engraved roll apparatus. The design and construction of the engraved roll used in the process of the invention may assist in achieving a product having the desired characteristics. The wall thickness of the roll may vary from about $\frac{3}{4}$ to about 2 inches. The roll may be dynamically balanced to ensure vibration-free operation. In general, the roll may not have a run-out greater than about 0.005. The engraved applicator roll consists of literally millions of substantially identical microscopic pockets known as cells. The surface of the roll may be engraved mechanically with minute cells shaped in the form of inverted pyramids, quads, or trihelicals, located on the surface at approximately a 45° angle to the axis of the roller. The engraved cell structure may be controlled to carry and deposit on the fabric substrate a specific volume per square inch area of the roll surface. Thus, the exact amount of fluoropolymer to be applied to the textile material may be determined.

In selecting the correct engraving, the objective should be to control the volume to levels that will produce the desired end result. Additional variables that may affect the volume applied may include viscosity of the coating, operating temperature, and percentage of solids in solution. The size of the cell may be calculated from the coating requirements and the density and solids content of the aqueous fluoropolymer solution to be applied.

As indicated in the attached drawings, the engraved roll apparatus includes a bottom roll that is engraved over the face with identical cells and will rotate in the fluoropolymer solution carried in a tray. Working on the face of the roll is a doctor blade made to oscillate over a short stroke in order to make it self-cleaning and leaving only solution in the cells. Also, oscillation of the blade may help to achieve even wear of the roll face and blade. The greater the number of cells or the greater their depth, the more coating will be applied on the fabric. On the textile material, the fluoropolymer solution will immediately appear as a series of dots close enough to each other to fuse and to give an even film across and along the web.

Once the roll has been engraved, it will continuously produce about the same wet thickness of a coating formulation if the doctor blade is working efficiently. The coating weight on the roller may, however, be changed somewhat by varying the solids content of the fluoropolymer solution. Generally, however, with a fluoropolymer solution of a given solids content in the tray, the gravure roll will continuously provide the required weight of coating on the textile material.

After the desired amount of fluoropolymer has been applied to the textile material, the resulting fluoropolymer-modified textile material may be heated to a temperature effective to dry and cure it. The temperature required to dry and cure the fluoropolymer-modified textile material, as well as the period of time required for such treatment, can vary widely. Generally, however, such drying and curing of the polymer-modified textile material can readily be achieved by heating the polymer-modified textile material to a temperature of from about 200° F. to about 400° F., preferably about 250° F. to about 250° F., for a period of time of from about 10 seconds to about 5 minutes, preferably from about 30 seconds to about 2 minutes.

Once the fluoropolymer-modified textile material has been dried and cured, it may be subjected to other processing steps such as brushing, napping, shearing, etc., as will be apparent to those skilled in the art.

Any suitable substantially oil- and water-resistant fluoropolymer may be employed in the practice of the present invention. It is believed, however, that in order for these fluoropolymers to be suitable, the fluorinated chain of the fluoropolymers should be capable of being distributed on the fibers of the textile material with proper orientation of the perfluoro group to provide an essentially fluorinated surface on discrete portions of such fibers.

The term "polymer" as used herein is to be understood to include adducts of two or more of the same or different monomeric units, such as dimers and trimers. Usually, the fluoropolymer is linear and may be a homopolymer of a fluorine monomer or a copolymer of a fluorinated monomer and a fluorine-free organic monomer. Such copolymers are generally random copolymers. The fluoropolymers which are useful in the practice of the present invention may be prepared from fluorinated organic precursors having the perfluoro carbon tail or radical at one end of the molecule and a reactive functional group at the other end of the molecule. The fluorinated precursor compound described above may then be reacted with another compound having functional groups reactable therewith to form the adduct or polymer. The fluorine-containing precursor compound may alternately be reacted with an ethylenically unsaturated organic compound containing a functional group reactable therewith to produce a vinyl monomer, such as an acrylate or methacrylate, which acrylate or methacrylate is then polymerized by vinyl addition to produce the ultimate polymer. Processes for producing such fluoropolymers are known in the art, for example, U.S. Pat. No. 2,642,416 and U.S. Pat. No. 2,803,615, the disclosures of which are hereby incorporated herein by reference.

Copolymers may also be prepared by co-reacting the above fluorinated monomers with various non-fluorinated ethylenically unsaturated organic monomers, including ethylene, vinyl acetate, acrylonitrile, acrylamide, styrene, acrylic and methacrylic acid, and alkyl esters thereof. Numerous other methods of producing such fluoropolymers are known in the art. Fluoropolymers, or liquid admixtures containing same, which are especially useful in the practice of the present invention, are commercially available from Minnesota Mining and Manufacturing Company, St. Paul, Minnesota, under the trademarks "Scotchgard ®" and 234, and from E. K. duPont de Nemours & Co., Wilmington, Delaware, under the trademarks Teflon ® and NPA&G soil and stain repeller products.

The term "fluoropolymer extender" as used herein is to be understood to mean non-fluorine-containing lubricants which serve to enhance the application of the fluoropolymer to the textile material and to reduce the overall amount of fluoropolymer needed. Any suitable lubricant which is compatible with the fluoropolymer and the textile material and which will improve the ease of application of the fluoropolymer as well as the amount of fluoropolymer required to achieve the desired level of soil resistance of the textile material can be employed. Such lubricants may include surfactants which may be cationic or non-ionic in character. Typical examples of fluoropolymer extenders meeting the above criteria and Hydronap 3A-FR, an ethoxylated fatty derivative available from Hydrolabs, Inc., of Paterson, New Jersey, and Ampitol PE-30, a polyethylene-containing composition available from Dexter Chemical of Bronx, New York.

It has been found that application of a fluoropolymer in the manner described above to a textile material, either alone or in combination with a fluoropolymer extender, and subsequent curing of resultant fluoropolymer-modified textile material substantially improves the soil resistance characteristics of such textile materials while in general not unduly adversely affecting the flame retardance characteristics of such materials.

The fluoropolymer may, as set forth above, be applied to the textile material either by itself or in combination with a fluoropolymer extender. As indicated, the fluoropolymer should be applied so that a discrete, discontinuous fluoropolymer coating is formed on the fibers on the stratum of fibers on and near the surface of the textile material. It has been found in this regard when the fluoropolymer is applied as an aqueous admixture using, for instance, padding or spraying application techniques, that the fluoropolymer is not sufficiently concentrated at or near the surface of the fabric where soil resistance is needed, but rather is more or less evenly distributed throughout a cross-section of the fabric. Therefore, such known techniques may require application of somewhat larger amounts of fluoropolymers, which is very costly and such larger amounts may tend to adversely affect the flammability characteristics of the textile material. It has, therefore, been found that particularly desirable results are obtained when the aqueous admixture is applied by means of an engraved roll, because the fluoropolymer is very uniformly applied to the textile material and the concentration of the fluoropolymer at or near the surface of the textile material is maximized.

In preparing the aqueous admixture containing the desired amount of a fluoropolymer emulsion, e.g., from about 0.5 to about 10 weight percent, preferably about 1 to 5 percent, the fluoropolymer emulsion which is generally a solid fluoropolymer dispersed in a liquid emulsion is admixed with a predetermined amount of water to provide the desired concentration of the fluoropolymer in the aqueous admixture. One particular method of preparing the aqueous fluoropolymer admixture is to admix an effective amount of FC-214 "Scotchgard" fluoropolymer emulsion into a predetermined amount of water to provide an aqueous admixture containing from about 0.3 to about 1.5 weight percent of the fluoropolymer. FC-214 "Scotchgard" brand fabric protector is a commercially available fluorochemical emulsion designed for use on upholstery fabrics and the like for imparting oil- and water-repellency, as well as an abrasion-resistant finish to the fabric. Such a composition contains as a general formulation the following:

30% solid-fluoropolymer
11% methyl isobutyl ketone
6% ethylene glycol
53% water

The above-described fluoropolymer emulsion is stated to have a pH of from 2.0–3.0, a cationic charge, and a density of 1.125 kg/liter.

Thus, since the above-described commercially available fluoropolymer emulsion contains 30 percent of the fluoropolymer, sufficient water is added to the emulsion to provide a resulting liquid admixture containing from about 0.1 to about 3 percent of the polymer.

Another especially suitable commercially available fluoropolymer emulsion which can be employed to form the aqueous fluoropolymer admixture for use in the process of the present invention is FC-234 "Scotchgard" brand fabric protector, a fluorochemical emulsion designed for use on upholstery fabrics. Such composition contains as a general formulation the following:

30% solids (fluoropolymer)
35% methyl isobutyl ketone
8% glycol
35% water

The above-described fluoropolymer emulsion is stated to have a pH of from 2.5 to 3.5, a cationic charge, and a density of 1.05 kg/liter.

The above-described fluoropolymer emulsions, upon dilution with water to contain the specified amounts of about 0.1 to about 3 weight percent of the fluoropolymer, will thus contain from about 0.10 to about 3.5 weight percent of an organic carrier, such as the methyl isobutyl ketone or methyl ethyl ketone and from about 0.02 to about 0.8 weight percent of a stabilizer, such as glycol or ethylene glycol.

Other suitable commercially available fluoropolymers and emulsions containing same which can be used to form the aqueous fluorocarbon admixtures containing from about 10 to about 30 weight percent of the fluorocarbon constituent are those fluorocarbon emulsions manufactured and sold by E. I. duPont de Nemours and Co., as Teflon ® brand fluoropolymer emulsions.

Any other suitable fluoropolymer, or aqueous emulsion of same, can be employed. However, it should be noted that if one is to obtain the desired result, the concentration of the fluoropolymer in the resulting aqueous admixture should be less than about 10 percent, preferably less than about 5 percent by weight based on the weight of the aqueous admixture; or, where it is used in combination with a fluoropolymer extender, it should not be more than about 3 weight percent. Larger amounts than those indicated may result in a textile fabric having poor or unacceptable flammability characteristics.

The amount of the fluorocarbon required to be present in the bath will also vary depending upon the wet pickup characteristics of the particular textile material being treated. For example, the synthetic, thermoplastic fiber-containing textile materials which can be treated in accordance with the process of the present invention will generally have a wet pickup of from about 5 to about 35 percent, more desirably from about 10 to about 30 percent.

In an embodiment of the present invention, it has been found that the soil resistance characteristics and even the flammability characteristics of the textile material may be improved even further by scouring the textile material, either prior to or subsequent to backcoating, but prior to application of the fluoropolymer, to remove residual processing aids which may be present on the textile material, as well as dirt and/or oily materials, and to adjust the pH of the textile material to a pH of less than about 7, more desirably of from about 4 to about 6.5. By scouring the textile material and adjusting the pH of the textile material to less than about 7, improved results may be obtained in the subsequent application of the fluoropolymer, as well as in other processing which may be performed on the textile material.

The scouring of the textile material to remove any residual textile processing aids, dirt, oil residues, and the like can be readily accomplished by passing the textile material through an aqueous detergent-containing solution heated to a temperature of from about 100° F. to about 200° F. and thereafter thoroughly rinsing the scoured textile material with water to ensure substantially complete removal of any residual detergent. Desirably, the rinse water may also be heated to a temperature of from about 100° F. to about 200° F.

The amount of the detergent constituent employed in the aqueous detergent-containing solution can vary widely as can the type of detergent. Generally, however, desirable results can be obtained when the amount of detergent constituent employed is from about 0.25 to about 1 weight percent, based on the total weight of the detergent solution. Any suitable detergent can be employed providing the detergent does not react with, or cause other deleterious effects, upon the textile material being scoured. Typical examples of suitable detergents which can be employed in the detergent-scouring of the textile material in accordance with the present invention include lauryl alcohol ethyoxylate, alkyl ether sulfates, and sulfonates.

After the textile material has been scoured with the detergent solution and thoroughly rinsed, the detergent-scoured material may then be passed through an aqueous acidic solution maintained at a temperature of from about 100° F. to about 200° F. to adjust the pH of the textile material to a pH of less than about 7, generally to a pH of about 4 to about 6.5. The amount of said acid constituent employed in the aqueous acid solution can vary widely, depending to a large extent upon the type of acid constituent. As currently envisioned, the passing of the detergent-scoured textile material through the aqueous acidic solution would be considered as a final step of the scouring of the textile material. It should be noted, however, that one could, if the textile material was substantially free of textile processing aids, dirt, oil residue, and the like, eliminate the detergent scouring step of the scouring process and thus the scouring of the textile material would consist only of passing the textile material through an aqueous acidic solution to adjust the pH of the textile material to the desired pH prior to application of the soil polymer to the textile material. It should further be noted that the scoured textile material can be dried prior to application of the fluoropolymer thereto; or, the fluoropolymer may be applied to the wet, scoured textile material. However, it is preferred that the fluoropolymer be applied to the wet, scoured textile material.

Any suitable acid may be employed as the acidic constituent of the acidic wash solution provided such acid does not have deleterious effects on the textile material being washed, or form a residue which interferes with the application of fluoropolymer or the dyeing of the fluoropolymer-modified textile material during subsequent processing steps. Illustrative of acids which may be employed are acetic acid, formic acid, butyric acid, citric acid, oxalic acid, and the like.

After washing and/or scouring and acid bath treatment of the material, it may be subjected to the next processing step, e.g., either backcoating of the textile material or application of the fluoropolymer in its wet state, or, more desirably, dried by contacting the wet textile material with a heat source to substantially dry same prior to application of either the flame retardant backcoating or the fluoropolymer.

It has been found that application of a flame-retardant backcoating to the textile material may permit the application of somewhat higher concentrations of fluoropolymer to the surface of the material without undue adverse effect on flammability, and it may be particularly beneficial when the flame retardance characteristics of the final product are particularly stringent or where the nature of the textile material is such that the applicable standards cannot be met without the application of a flame-retardant material. In addition to improvement of the flame retardance characteristics of the textile material, the providing of a backcoating may also provide other desirable properties in the textile material making it particularly suitable for an automotive upholstery fabric. Thus the backcoating may serve to improve dimensional stability, tensile strength, and abrasion resistance; to minimize seam slippage; and to prevent or minimize the textile material from unraveling or cutting. Further, the latex backcoating may improve the hand of the material by providing the material with body and weight. In addition, backcoating of a textile material may also help to prevent or minimize distortion of patterns on plush and flat textile materials.

Application of the backcoating composition to the textile material may be accomplished by any suitable means known in the art. Typical of such means are the knife-over-roll coater. In such a process, two or three coating knife arrangements may be used in tandem or sequentially to deposit and smooth the coating while it is still wet and fluid.

Another suitable method for backcoating the textile material is the use of reverse-rotating coating rolls. When employing such equipment, the amount of coating to be applied is precisely metered prior to application to the fabric by a wiping action. Use of precision-ground and mounted coating rolls makes possible control of coating weight to within about 0.002-inch thickness.

The backcoating of the textile material may also be carried out using an engraved-roll or rotogravure coating unit. In employing such, the coating compound may not be metered prior to application to the textile material. The total thickness of coating plus textile material may be metered through the gap formed by the reverse smoothing roll and the backing roll. Any variation in thickness of the textile material is reflected in corresponding thicker or thinner coating at such areas.

In addition to the wet coating processes, typical ones which have been set forth above, one might also employ any of the numerous dry (e.g., 100 percent solids) coating processes. Typical dry coating processes which are well known in the art are the hot-melt coating process and the like.

While any of the above-similar coating processes may be employed for the application of the backcoating composition to the back of the textile material, especially desirable results have been obtained when using a wet coating process, such as the knife-over-roll coating process.

A wide variety of elastomer coating compositions may be employed as the backcoating composition, so long as they function to improve flame-retardance characteristics of the textile material. Typical elastomer coating compositions include styrene-butadiene rubber, acrylic ester latex compositions, urethane polymers, vinyl acetate polymers, polyvinyl chloride polymers, vinylidene chloride polymers, and the like.

Where the elastomer employed in the backcoating composition is not itself a flame-retardant material, or where it is determined to be necessary or desirable to further improve the flame resistance characteristics of the textile material where the elastomer is itself a flame retardant, the elastomer composition may be provided with a separate active flame-retardant component. Such active flame-retardant components may include, for instance, antimony compounds, e.g., antimony oxide; silicates, e.g., aluminum silicates; phosphorous-containing materials, especially organic phosphonates; borate salts, e.g., zinc borate; aluminum-containing compounds, e.g., alumina hydrate; organic halogen-containing compounds, e.g., decabromodiphenyloxide; and other well-known flame retardants suitable for use in textile materials. Typically, when the backcoating contains an active flame-retardant component in addition to the polymeric material such component may be present in the backcoating composition in amounts ranging up to about 200, preferably about 20 to about 60 parts per 100 parts of latex, based on the weight of the backcoating composition (solids basis).

The amount of backcoating composition employed to backcoat the textile materials of the invention may vary widely. Generally, however, such coatings will be very lightweight coatings, ranging from about 2 to about 4 ounces of backcoating composition on a solids basis per square yard of textile material. The latex coating compositions employed to backcoat the textile materials may contain from about 5 to about 50 weight percent solids in order to assure uniform coating of the textile material. Such latex coating compositions may be provided with a relatively high viscosity (e.g., from about 2000 cps to about 50,000 cps) to avoid striking through the textile material. Fillers, e.g., clays or whitings, may be used. Normally about 50 to about 300 parts of filler per 100 parts of latex may be employed to avoid stiffening of the textile material.

Typical of such backcoating compositions are aqueous emulsions having the following formulations:

|  | PARTS |
|---|---|
| FORMULATION I | |
| Polyvinyl Chloride Polymer | 100 |
| Decabromodiphenyl Oxide | 30 |
| Antimony Oxide | 14 |
| Water | 125 |
| FORMULATION II | |
| Acrylic Polymer | 100 |
| Aluminum Hydrate | 53 |
| Zinc Borate | 26 |
| Zinc Oxide | 7 |
| Fyrol FR-2 (Stauffer) | 79 |

Numerous other flame-retardant latex coating compositions which are well known in the coating art may be used to backcoat the textile material of the present invention.

After the desired amount of the latex coating composition has been applied to the back of the textile material, the resulting backcoating textile material may be heated to a temperature effective to substantially cure the latex coating composition and provide a substantially backcoated textile material. The temperature to which the resulting backcoated textile material may be heated, as well as the period of time of such heating required to cure the latex coating composition and dry the resulting textile material, can vary widely, depending to a large extent on the amount of latex coating composition applied to the back of the textile material, as well as the general type of such composition. Generally, however, it has been found that such curing of the latex backcoating composition and the drying of the resulting textile material may readily be achieved by heating the backcoated textile material to a temperature of from about 275° F. to about 375° F. for a period of time of from about 30 seconds to about 10 minutes. After the textile material has been modified by the application of the fluoropolymer, and backcoated, the textile material may be sheared to remove uneven hairs from the face of such material and thereby provide a more uniform surface. Any suitable shearing process well known in the textile art may be employed.

Various other processing steps may be performed on the textile material of the present invention. For instance, the textile material may be dyed by any of a variety of suitable methods such as jet dyeing, transfer printing, screen printing, and the like. Such dyeing may usually be performed prior to the application of the fluoropolymer to the textile material. Alternatively, however, the dyeing may be performed after the application of the fluoropolymer, especially where a printed color decoration on the surface of the textile material is desired or when definite repeated forms and colors are employed to form a pattern. Such a technique for dyeing a fluoropolymer textile material is disclosed, for instance, in U.S. Pat. No. 4,131,744 to Lorence M. Moot (Milliken Research Corporation). Especially desirable results may be obtained when the fluoropolymer-modified textile material is dyed using a jet dyeing process and apparatus such as disclosed in U.S. Pat. Nos. 4,084,615; 4,034,585; 3,985,006; 4,059,880; 3,937,045; 3,894,413; 3,942,342; 3,939,675; 3,892,109; 3,942,343; 4,033,154; 3,969,779; 4,019,353; pending U.S. patent application U.S. Ser. No. 686,900, filed May 17, 1976, entitled "Printing of Pattern Designs with Computer Controlled Pattern Dyeing Device"; and U.S. patent application Ser. No. 806,783, filed June 15, 1977, entitled, "Apparatus for the Application of Liquids to Moving Materials," each of said patents and patent applications being hereby expressly incorporated by reference.

In order to more fully depict the process for improving the soil resistance characteristics of textile materials in accordance with the invention, reference will now be made to the drawing. The drawing represents schematic diagrams of sequential processing steps. However, it is to be understood that one could conduct such sequential processing steps as a continuous process.

Figure 1:
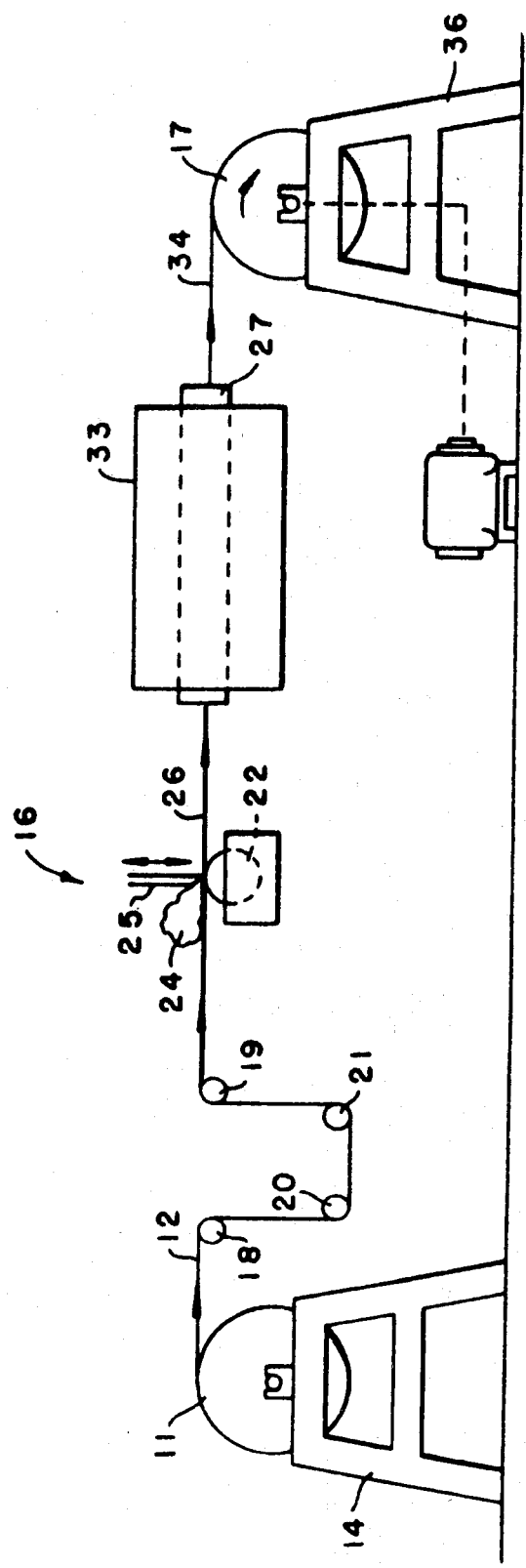
FIG. 1 is a schematic representation of an apparatus for applying the backcoating to the textile material.

Referring now to the drawing, and particularly FIG. 1, a supply roll 11 of textile material 12 is mounted on a suitable support 14. The advancement of material 12 through the backcoating apparatus 16 is indicated by the solid line in the direction of the arrows. The textile material 12 is continuously withdrawn from roll 11 by power-driven take-up roll 17 and passed over a plurality of support rollers such as 18 and 19, idler rollers 20 and 21, and brought into contact with backcoating apparatus 16. Backcoating apparatus 16 is depicted as having a support roller 22, a supply source 24 for supply to the elastomer or latex backcoating composition to the back of textile material 12, and a doctor knife 25. Doctor knife 25 is adjustably positioned in a spaced relationship with support roller 22 and textile material 12 to remove excess latex backcoating composition from textile material 12 and also to insure a substantially uniform coating of the latex backcoating composition to the back of the material.

After the desired amount of latex backcoating has been applied to the back of textile material 12, the backcoated textile material 26 is advanced to tenter frame 27 where the material is framed to a desired width. Tenter frame 27 extends through curing oven 33 so as to maintain the textile material at a desired width during the curing of the latex backcoat. Backcoated textile material 26 is passed through curing oven 33 at a sufficient rate to insure that the latex coating composition is completely dried and cured. Generally, the latex coating composition can be dried and cured if the oven is maintained at a temperature of from about 250° F. to about 375° F. and the coated textile material is maintained in the oven for a period of time of from about 1.5 minutes to about 2 minutes. The cured latex-coated material 34 is then advanced to take-up roll 17, which is mounted on a suitable support 36.

Figure 2:
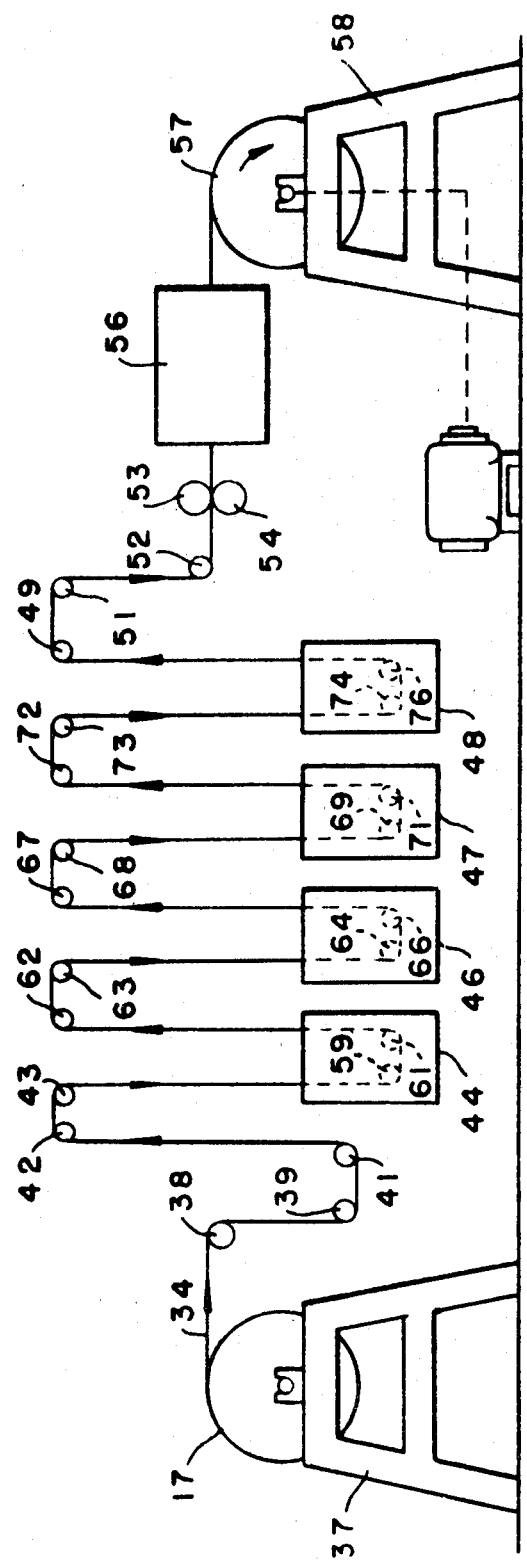
FIG. 2 is a schematic representation of an apparatus for scouring the textile material and to adjust the pH of such textile material.

Referring now to FIG. 2, an apparatus for scouring the cured latex-coated textile material produced in FIG. 1 is depicted. Supply roll 17', which was take up roll 17 of FIG. 1, contains the cured latex-coated material 34. Supply roll 17' is mounted on a suitable support 37, and the advancement of material 34 through the scouring apparatus is indicated by the solid line in the direction of the arrows. Material 34 is withdrawn from roll 17 and advanced over a plurality of rollers such as 38, 39, 41, 42, and 43; through a plurality of scouring vessels such as 44, 46, 47, and 48; over a second plurality of rollers such as 49, 51, and 52; through nip rollers 53 and 54; through drier means 56; and then to take-up roller 57, which is mounted on a suitable support 58. Take-up roller 57 may be a power-driven take-up roller to insure proper advancement of material 34 through the scouring vessels and the drying means.

In the scouring of textile material 34 using the plurality of scouring vessels as depicted, one can remove residual textile-processing aids, dirt, and oily deposits in the first of the series of scouring vessels and adjust the pH of textile material 34 in the 1st of the scouring vessels. To be more explicit, scouring vessel 44 contains an aqueous detergent solution as hereinbefore set forth; vessel 48 contains an aqueous acidic solution as has likewise herebefore been described. Each of the aqueous mediums in the scouring vessels is maintained at a temperature of from about 100° F. to about 200° F., more typically about 120° F. Textile material 34 is maintained in a substantially taut position as it passes through scouring vessels 44, 46, 47, and 48, by a plurality of support rollers such as rollers 59, 61, 62, 63, 64, 66, 67, 68, 69, 71, 72, 73, 74, and 76. Excess aqueous acidic solution used to adjust the pH of the textile material is removed by passing the wet material through nip rollers 53 and 54 prior to passing the acid-treated material into drier means 56, in which the material is heated to a temperature sufficient to substantially dry the textile material. The desired pH-adjusted textile material is then advanced to take-up roll 57 and from there can be stored for subsequent use in the application of the fluoropolymer and the process depicted in FIG. 3, or moved directly to such process.

Figure 3:
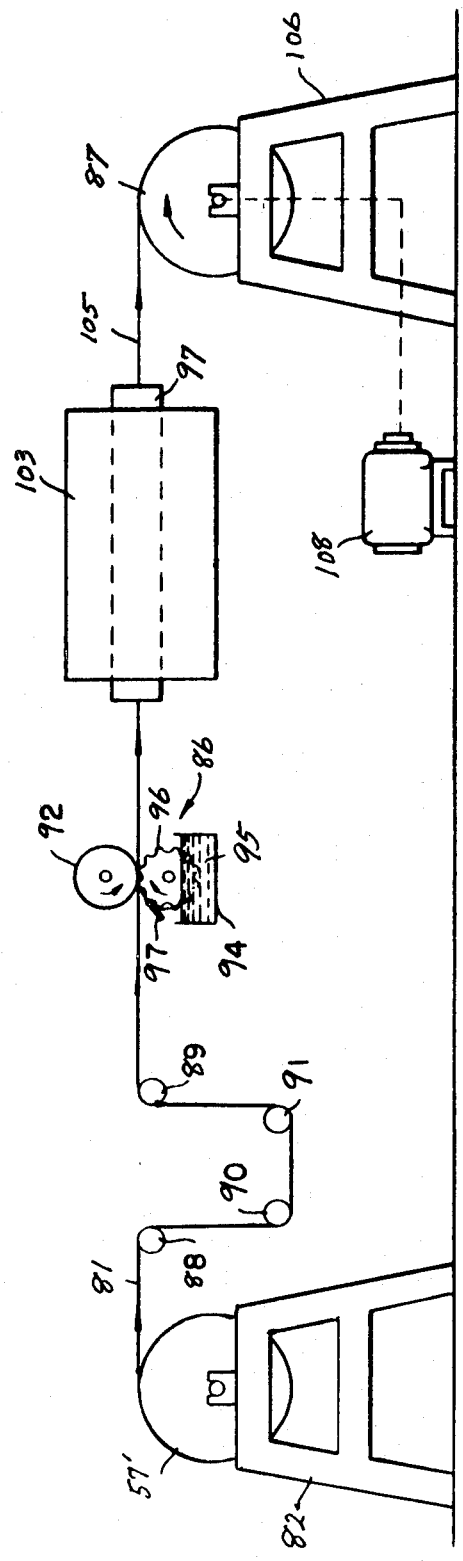
FIG. 3 is a schematic representation of an apparatus for applying the fluoropolymer to the textile material.

Referring now to FIG. 3, a process and apparatus suitable for applying the fluoropolymer to the pH-adjusted, backcoated textile material is set forth. Supply roll 57', which was take-up roll 57 of FIG. 2, contains pH-adjusted, dried, backcoated textile material 81. Supply roll 57' is mounted on a suitable support 82 and the advancement of material 81 through the engraved roll apparatus is indicated by the solid line in the direction of the arrows. The textile material 81 is continuously withdrawn from roll 57' by power-driven take-up roll 87 and passed over a plurality of support rollers such as 88 and 89, idler rollers 90 and 91, and brought into contact with engraved roll apparatus 86. Engraved roll apparatus 86 is depicted as having a pressure roller 92, a supply reservoir 94 for supplying the fluoropolymer composition 95 to the engraved roll mechanism 96. Doctor knife 97 is adjustably positioned in a spaced relationship with engraved roll mechanism 96 to remove excess fluoropolymer composition 95 from engraved roll 96 so that the amount transferred to textile material 81 may be adjusted to the desired level.

After the desired amount of fluoropolymer composition has been applied to the textile material, the textile material may be advanced to tenter frame 97, where the material is framed to a desired width and passed through curing oven 103 at a sufficient rate to insure that the fluoropolymer applied to the surface of the textile material is completely dried and cured. Generally, the composition can be dried and cured if the oven is maintained at a temperature of from about 200° F. to about 400° F. and the textile material is maintained in the oven for a period of from about 10 seconds to about 5 minutes. The cured, dried textile material 105 is then advanced to take-up roll 87, which is mounted on a suitable support 106. Take-up roll 87 is driven by drive means 108.

FIG. 4 is an enlarged view of engraved roll mechanism 86 shown in FIG. 3. The identifying numbers refer to the same parts of the apparatus identified in FIG. 4. FIG. 4 more clearly illustrates the function of doctor knife 97 to regulate and control the amount of fluoropolymer applied to the textile material. The figure further illustrates the function of the engraving on the engraved roll to meter the amount of fluoropolymer composition applied to the textile material. FIGS. 5 and 6 illustrate further alternative embodiments and the identifying numerals again refer to the same parts of the apparatus identified in FIGS. 3 and 4. In FIG. 56, guide rolls 110, 112, 114, and 116 serve to pass the fabric 81 through the engraved roll mechanism in a direction that is other than normal to the radius of the engraved roll 96. Such disposition of the textile material may serve to regulate the amount of fluoropolymer pickup by the textile material by increasing the area of contact between the engraved roll 96 and the textile material 81. In FIG. 6, guide rolls 114 and 116 are disposed below the plane, which is normal to the perpendicular radius of the engraved roll so that the textile material 81 has a prolonged period of contact with the engraved roll 96.

The preceding sequences, steps, and processes set forth schematically illustrate the most desired method for producing the improved products in accordance with the present invention. In order to more fully illustrate the concept of the subject invention, the following examples are given. It is to be understood, however, that such examples are not to be construed as unduly limiting the scope of the invention as set forth in the appended claims.

EXAMPLE 1

In this Example, 4 trials were run to illustrate the relative flammability characteristics and soil resistance characteristics of a knitted, 50 percent polyester, 50 percent nylon automotive upholstery fabric. Values are provided for a control sample (Trial 1), to which no fluorocarbon soil resistance finish has been applied, as is presently the practice for automotive upholstery fabrics being supplied to the automotive industry. In Trials 2 and 3, the fluorocarbon finishes identified in column 2 of Table 1 were applied by padding from a pad bath. In Trial 4, the fluorocarbon finish was applied by means of an engraved roll.

As to Trials 2–4, an aqueous solution for application to the fabric was prepared containing 30 grams per liter (3.0 percent by weight) of an emulsified, cationic fluorochemical as identified in column 2 of Table 1. In each instance, an aqueous admixture resulted containing about 0.9 percent fluoropolymer. In Trials 2 and 3, when the aqueous solution was padded onto the textile material, wet pickup of solution on the fabric and percent fluorocarbon solids applied to the fabric based on dry fabric weight were 60 percent wet pickup, resulting in 0.54 percent of the fluoropolymer being applied to the fabric. The samples were cured at 300° F. for 5 minutes, removed from the oven, and cooled to room temperature. In Trial 4, the fluoropolymer set forth in column 2 was applied to the surface of a knitted 50 percent polyester, 50 percent nylon automotive upholstery fabric (this was the same fabric used in runs 1 through 3). Application in Trial 4 was by means of the apparatus depicted in FIG. 1. Wet pickup of solution on the fabric and percent fluorocarbon solids applied to the fabric based on dry fabric weight were 20 percent wet pickup resulting in 0.18 percent of the fluoropolymer being applied to the fabric. The sample was cured at 300° F. for 5 minutes, removed from the oven, and cooled to room temperature.

All of the samples were then evaluated to determine compliance with the United States Government Department of Transportation Motor Vehicle Standard Test No. 302, used to determine char length in the warp and fill directions, burn time in the warp and fill directions, and burn rate of materials used in the occupant compartment of automobiles. According to the test, a sample of the fabric was mounted horizontally in a U-shaped clamp. The mounted sample was placed in an enclosed cabinet, a Bunsen burner was positioned under the open end of the clamp, and the flame was adjusted to 1.5 inches in height. The fabric was exposed for 15 seconds to the flame from the burner tip, which was placed 0.75 inch from the fabric. Then burn time, burn rate, and char length characteristics were determined using standards specified in the Standard Test Method. In essence, for a fabric sample to pass the test and thus be eligible for use in automobiles, a fabric sample must exhibit a burn rate of less than 2.4 inches per minute. The results are summarized in the Table.

As the Table indicates, where the sample of the particular base fabrics is appied with no soil-resistant finish, it is self-extinguishing and easily passes the test. The oil-resistance and spray-rating values for the sample, however, are both 0 [oil-resistance and water-resistance (spray-rating) values were determined using AATCC Standards 118-1966 and 22-1967]. These values indicate that the sample has very poor soil-resistance characteristics.

In Trials 2 and 3, it can be seen that the oil-resistance and water-resistance values are very much improved to 100 for spray rating and 5 for oil rating. Generally, oil ratings of about 5 or more are considered to be acceptable for automotive upholstery. As to the spray rating which measures the water resistance of a fabric—that is the resistance to penetration by water—in general such fabrics should resist such penetration if they are to resist staining and soiling which may occur in automotive upholstery fabrics. It is felt that spray-rating values in excess of about 70 should be acceptable for automotive upholstery. While the soil-resistance characteristics of the padded samples appear to be quite improved over that for the control sample and to, in fact, be acceptable for automotive upholstery, unfortunately such padded substrates cannot be sold to the automotive industry because they fail the flammability test as indicated by a burn rate for Trial 2 of 4.5 in the fill direction and a burn rate for Trial 3 of 4.81 in the fill direction.

In Trial 4, surprisingly at a much lower solids pickup of the fluoropolymer, the soil-resistance characteristics are virtually identical to that indicated for the fluorocarbon-treated padded samples of Trials 2 and 3. These values are considered to be very acceptable for a fabric in automotive applications. Moreover, however, the fabric in fact passes the Horizontal-DOT 302 Test, having a burn rate of only 1.6, which is within the acceptable limits, specified by the government, of less than 2.4 inches per minutes.

TABLE I

| Trial | Fluorocarbon and Method of Treatment | Solids Pick-up % Based on Fabric Weight | Warp (W) or Fill (F) | Horizontal-DOT 302 Char Length (In.) | Burn Time (Min.) | Burn Rate In./Min. | Spray Rating | Oil Rating |
|---|---|---|---|---|---|---|---|---|
| 1 | Control | 0 | W | | | SE* | 0 | 0 |
|   |         |   | F | | | SE  |   |   |
| 2 | 3% FC-214 padded (75% WPU)*** | 0.675 | W | | | SE/NBR** | 100 | 5 |
|   |         |       | F | 11.50 | 2.54 | 4.5 |   |   |
| 3 | 3% FC-234 padded (75% WPU) | 0.675 | W | 6.64 | 2.92 | 2.28 | 100 | 5 |
|   |         |       | F | 10.79 | 2.24 | 4.81 |   |   |
| 4 | 3% FC-214 Engraved Roll (20% WPU) | 0.180 | W | | | SE | 100 | 5 |
|   |         |       | F | 2.74 | 1.73 | 1.6 |   |   |

*S.E.—Self Extinguishing
**S.E./N.B.R.Self Extinguishing/No Burn Rate
***Wet Pick-up

EXAMPLE 2

In this Example, summarized in Table 2, an aqueous solution containing a fluorochemical was prepared as set forth in Example 1. In Trial 1, flammability characteristics and soil-resistance characteristics are provided for a control sample of a knitted 100 percent polyester automotive upholstery fabric to which no soil-resistance finish was applied. The sample passes the flammability test but has a poor spray rating.

In Trial 2, a separate sample from the same lot of fabric as the control sample was padded from a 3 percent aqueous solution of the polymer (FC-214) (70 percent wet pickup, 0.63 percent fluoropolymer applied to the fabric). As can be seen, the spray rating (water resistance) is much improved, but the burn-rate value is very marginal and could not be relied upon for a commercial product.

In Trial 3, the apparatus as set forth in FIG. 4 was employed to apply the polymer (20 percent wet pickup, 0.18 percent fluoropolymer applied). As can be seen, the spray rating remained at a very high level, even with a much lower application rate. Furthermore, the sample did not even ignite so that the flammability characteristics are acceptable for automotive applications.

TABLE II

| Trial | Method of Treatment | Warp (W) or Fill (F) | Horizontal-DOT 302 Char Length (In.) | Burn Time (In.) | Burn Rate (In./Min) | Spray Rating |
|---|---|---|---|---|---|---|
| 1 | Control | W | 0 | 0 | DNI* | 0 |
|   |         | F | 0 | 0 | DNI  |   |
| 2 | 3% Padded | W | | | SE** | 80 |
|   |           | F | 3.04 | 1.28 | 2.4 |   |
| 3 | 3% Engraved Roll | W | | | DNI | 80 |
|   |                  | F | | | DNI |    |

*D.N.I.—Did Not Ignite
**S.E.—Self Extinguishing

EXAMPLE 3

This Example illustrates the necessity of controlling the amount of fluorochemical applied to the textile substrate, even when the method of application is by means of an engraved roll in each instance. The results are summarized in Table 3. Column 1 in the Table provides an identification of the automotive fabric substrate. In Column 2, the concentration of fluorochemical (FC-214 in each instance) in the aqueous solution is indicated. At 4.5 percent fluorochemical concentration in the aqueous solution applied, the wet pickup was 20 percent, resulting in 0.27 percent of the fluoropolymer being applied to the fabric. At 6.0 percent, 0.36 percent of the fluoropolymer was applied to the fabric at the same 20 percent wet pickup. As can be seen from Table 3, the soil-resistance characteristics are comparable in most instances and generally acceptable for automotive applications. At the higher level of fluorochemical application, however, the flammability characteristics are generally less acceptable.

TABLE III

| Trial and Fabric | Fluorochemical Concentration of Aqueous Solution | Warp (W) or Fill (F) | Horizontal-DOT-302 Char Length (In.) | Burn Time (Min.) | Burn Rate (In./Min.) | Oil Rating | Spray Rating |
|---|---|---|---|---|---|---|---|
| 1. 50% nylon 50% polyester warp knit | 4.5% | W | | | SE | 5 | 90 |
|   |      | F | 2.0 | 1.0 | 2.0 |   |   |
| 2. 50% nylon 50% polyester warp knit | 6.0% | W | | | SE | 5 | 90 |
|   |      | F | 10.0 | 3.5 | 2.9 |   |   |
| 3. 100% polyester plush knit | 4.5% | W | | | SE | 0 | 90 |
|   |      | F | | | SE |   |   |
| 4. 100% polyester plush knit | 6.0% | W | | | SE | 0 | 90 |
|   |      | F | 6.25 | 3.25 | 1.9 |   |   |
| 5. 100% poly- | 4.5% | W | | | SE | 5 | 90 |

TABLE III-continued

| Trial and Fabric | Fluorochemical Concentration of Aqueous Solution | Warp (W) or Fill (F) | Horizontal-DOT-302 | | | Oil Rating | Spray Rating |
|---|---|---|---|---|---|---|---|
| | | | Char Length (In.) | Burn Time (Min.) | Burn Rate (In./Min.) | | |
| ester woven | | F | 10.0 | 3.1 | 3.2 | | |
| 6. 100% polyester woven | 6.0% | W | 10.0 | 3.5 | 2.9 | 5 | 90 |
| | | F | 10.0 | 2.55 | 3.9 | | |
| 7. 100% polyester warp knit | 4.5% | W | | | SE | 5 | 80 |
| | | F | 2.25 | 1.0 | 2.25 | | |
| 8. 100% polyester warp knit | 6.0% | W | | | SE | 5 | 90 |
| | | F | 6.50 | 2.15 | 3.0 | | |

EXAMPLE 4

This Example illustrates the significance of the application of a flame-retardant backcoating to certain samples within the scope of the present invention to provide a product having acceptable burn-rate characteristics. Trial 1 is a control and, as Table 4 indicates, it has acceptable flammability characteristics with no fluorochemical having been applied. After application of FC-214 to the fabric, however, from an aqueous bath containing 6 percent of the fluorochemical (0.36 percent fluorochemical applied at 20 percent wet pickup) as Trial 2 indicated, the flammability characteristics were such that the DOT test could not be passed, e.g., 2.9 in./min. in the fill direction. After the fabric was backcoated, Trial 3, with a Flame Retarder N composition, to a pickup of 20 percent by weight based on the weight of the fabric, the fabric was self-extinguishing, as was the control. Flame Retarder N is an inorganic flame-retardant salt sold by Consos, Inc., Charlotte, North Carolina. Flame retarder or composition contained 20 percent by weight Flame Retardant N, about 40 percent polyvinylidene chloride which functions as a binder, with the remainder being fillers. A similar procedure was followed in Trials 4 through 10, using different flame-retardant backcoating compositions. In Trial 4, according to the invention, the fluorochemical was applied by a gravure roll, and the sample was backcoated with the indicated flame retardant in the form of a composition wherein the remaining components were the same as those employed in Trial 3. A similar procedure was followed in Trials 5 through 10, varying the flame-retardant material employed. In Table 4, decabromodiphenyloxide is an organic salt sold by Aurolux Chemical, Inc., of Hope Valley, Rhode Island. Glotard N.T.B. is an organic phosphorus compound made by Glotext Chemical, Inc., of Roebuck, South Carolina. Flame Retarder PL is a liquid blend of ammonium salts and organic nitrogenous compounds sold by Consos, Inc., of Charlotte, North Carolina.

TABLE IV

| Trial | Method of Treatment (Engraved Roll) | Warp (W) or Fill (F) | Horizontal-DOT-302 | | |
|---|---|---|---|---|---|
| | | | Char Length (In.) | Burn Time (Min.) | Burn Rate (In./Min.) |
| 1-100% polyester knit | Control | W | | | SE |
| | | F | | | SE |
| 2-100% polyester knit | 6% FC-214 | W | | | SE |
| | | F | 4.28 | 1.75 | 2.45 |
| 3-100% polyester knit | 20% Flame Retarder N B/C* | W | | | SE |
| | | F | | | SE |
| 4-100% polyester knit | 20% Flame Retarder N, 6% FC-241 | W | 2.46 | 2.4 | 1.02 |
| | | F | 2.50 | 2.0 | 1.25 |
| 5-100% polyester knit | 20% DBDPO** B/C* | W | | | SE |
| | | F | | | SE |
| 6-100% polyester knit | 20% DBDPO** B/C* 6% FC-241 | W | | | SE |
| | | F | 2.38 | 1.5 | 1.59 |
| 7-100% polyester knit | 20% Glotard N.T.B. B/C* | W | | | SE |
| | | F | | | SE |
| 8-100% polyester knit | 20% Glotard N.T.B. B/C* 6% FC-241 | W | | | SE |
| | | F | | | SE |
| 9-100% polyester knit | 20% Flame Retard PL B/C* | W | | | SE |
| | | F | | | SE |
| 10-100% polyester knit | 20% Flame Retarder PL B/C | W | | | SE |
| | | F | | | SE |

*B/C—Backcoating Composition
**Decabromodiphenyloxide Backcoating Composition

What is claimed is:

1. A textile material suitable for use as an automotive upholstery fabric which comprises:
   (a) a body portion having a face and a back comprised of synthetic, thermoplastic fibers;
   (b) said body portion being provided with a substantially oil and water-repellent fluoropolymer substantially evenly distributed on the face thereof and remaining substantially on or near the face surface of said textile material, said fluoropolymer being provided in a minor amount sufficient to improve soil resistance characteristics but less than an amount which would cause said material to burn at a rate in excess of about 2 inches per minute or to support such burning for longer than about one minute as determined by United States Government Department of Transportation Motor Vehicle Standard Test Number 302; and
   (c) said textile material further having been backcoated with a flame-retardant backcoating in an amount sufficient to improve the flammability characteristics of said textile material.

2. The textile material of claim 1, wherein the amount of substantially oil- and water-repellent fluoropolymer provided on said fibers is less than about 0.3 percent by weight on a solids add-on basis.

3. The textile material of claim 1, wherein said thermoplastic fibers are selected from polyamide fibers and polyester fibers.

4. The textile material of claim 3, wherein said textile material is made entirely of said thermoplastic fibers.

5. The textile material of claim 1, wherein said flame retardant backcoating is an elastomer coating composition selected from styrene-butadiene rubber; acrylic ester latex composition; urethane polymer composition; vinyl acetate polymer composition; vinyl chloride polymer composition; and vinylidene chloride polymer composition.

6. The textile material of claim 5, wherein said backcoating composition further contains up to about 200 parts by weight based on the weight of the elastomers of an active flame retardant component selected from antimony compounds; silicates; phosphorous-containing materials; borate salts; aluminum-containing compounds; and organic halogen-containing compounds.

7. The textile material of claim 6, wherein the amount of backcoating applied on a solids-add-on basis is from about 2 to about 4 ounces per square yard of textile material.

8. A textile material suitable for use as an automotive upholstery fabric which comprises:
   (a) a body portion having a face and a back comprised of synthetic, thermoplastic fibers;
   (b) said body portion being provided with a substantially oil and water-repellent fluoropolymer substantially evenly distributed on the face thereof and remaining substantially on or near the face surface of said textile material, said fluoropolymer being provided in a minor amount sufficient to improve soil resistance characteristics but less than 0.3 percent by weight on a solids add-on basis;
   (c) said textile material further having been backcoated with a flame-retardant backcoating in an amount sufficient to improve the flammability characteristics of said textile material.

* * * * *